US008462714B2

(12) United States Patent
Taoka et al.

(10) Patent No.: US 8,462,714 B2
(45) Date of Patent: Jun. 11, 2013

(54) BASE STATION, TRANSMISSION METHOD, MOBILE STATION, AND RECEPTION METHOD

(75) Inventors: Hidekazu Taoka, Tokyo (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 147 days.

(21) Appl. No.: 12/680,682

(22) PCT Filed: Sep. 29, 2008

(86) PCT No.: PCT/JP2008/067659
§ 371 (c)(1),
(2), (4) Date: Jun. 9, 2010

(87) PCT Pub. No.: WO2009/044704
PCT Pub. Date: Apr. 9, 2009

(65) Prior Publication Data
US 2010/0260118 A1 Oct. 14, 2010

(30) Foreign Application Priority Data
Oct. 1, 2007 (JP) ................................ 2007-258108

(51) Int. Cl.
*H04W 4/00* (2009.01)

(52) U.S. Cl.
USPC ............ 370/329; 370/338; 370/341; 370/348

(58) Field of Classification Search
USPC .................. 370/329, 338, 341, 342; 375/144, 375/260; 455/101, 522
See application file for complete search history.

(56) References Cited

U.S. PATENT DOCUMENTS

| 6,928,296 | B2 * | 8/2005 | Kanemoto et al. | 455/522 |
| 7,020,445 | B1 * | 3/2006 | Miya | 455/101 |
| 2002/0061051 | A1 * | 5/2002 | Kitahara | 375/144 |
| 2002/0136187 | A1 * | 9/2002 | Aoyama et al. | 370/342 |
| 2008/0095251 | A1 * | 4/2008 | Yeh et al. | 375/260 |

FOREIGN PATENT DOCUMENTS

| EP | 1 898 545 A1 | 3/2008 |
| JP | 2004-072539 A | 3/2004 |
| JP | 2005-065242 A | 3/2005 |
| JP | 2006-211366 A | 8/2006 |
| JP | 2007-089144 A | 4/2007 |
| WO | 2007/004490 A1 | 1/2007 |

OTHER PUBLICATIONS

International Search Report w/translation from PCT/JP2008/067659 dated Nov. 4, 2008 (4 pages).
Written Opinion from PCT/JP2008/067659 dated Nov. 4, 2008 (5 pages).
3GPP TSG RAN WG1 Meeting #48, R1-070859; "Adaptive Beamforming in E-UTRA"; NTT DoCoMo, et al; St. Louis, USA; Feb. 12-16, 2007 (8 pages).
3GPP TSG-RAN WG1 Meeting #48bis, R1-071608; "Beamforming with eight transmit antennas for E-UTRA DL"; Ericsson; St. Julians, Malta; Mar. 26-30, 2007 (3 pages).

* cited by examiner

*Primary Examiner* — Hassan Kizou
*Assistant Examiner* — Toan Nguyen
(74) *Attorney, Agent, or Firm* — Osha Liang LLP

(57) ABSTRACT

A base station communicating using multiple antennas includes a direction-of-arrival (DOA) estimation unit configured to estimate a direction of arrival based on a signal from a mobile station and to output direction-of-arrival information regarding the estimated direction of arrival; a DOA information multiplexing unit configured to multiplex the direction-of-arrival information from the direction-of-arrival estimation unit with a shared data channel to be transmitted to the mobile station; and an antenna weight multiplying unit configured to multiply a signal to be transmitted to the mobile station and including the shared data channel multiplexed with the direction-of-arrival information by antenna weights obtained based on the direction-of-arrival information from the direction-of-arrival estimation unit.

6 Claims, 5 Drawing Sheets

(A) 4 ANTENNAS (B) 6 ANTENNAS

| P1 | REFERENCE SIGNAL FOR ANTENNA #1 | P4 | REFERENCE SIGNAL FOR ANTENNA #4 | ☐ | DATA CHANNEL |
| P2 | REFERENCE SIGNAL FOR ANTENNA #2 | P5 | REFERENCE SIGNAL FOR ANTENNA #5 | | |
| P3 | REFERENCE SIGNAL FOR ANTENNA #3 | P6 | REFERENCE SIGNAL FOR ANTENNA #6 | | |

BASE STATION, TRANSMISSION METHOD, MOBILE STATION, AND RECEPTION METHOD

TECHNICAL FIELD

The present invention generally relates to a mobile communication system including a base station having multiple antennas and a mobile station communicating with the base station. More particularly, the present invention relates to a mobile communication system employing adaptive antenna array beam forming based on a direction-of-arrival estimation.

BACKGROUND ART

In multi-antenna radio transmission technologies based on multiple input multiple output (MIMO), methods for transmitting a directional beam from a base station (BS) in the direction of a mobile station (or user equipment (UE)) are being employed. One example of such methods is adaptive antenna array beam forming (AAA-BF) where a base station estimates the direction of arrival (DOA) of a signal from a mobile station and transmits a directional beam in the estimated direction of arrival.

AAA-BF is described below with reference to FIG. 1. As shown in FIG. 1, a communication system 10 includes a mobile station UE and a base station BS. The base station BS includes four antennas 11A-11D, RF transmission circuits 12A-12D connected to the corresponding antennas 11A-11D, multipliers 13A-13D connected to the corresponding RF transmission circuits 12A-12D, a distributor 14 connected to the multipliers 13A-13D, RF reception circuits 15A-15D connected to the corresponding antennas 11A-11D, multipliers 16A-16D connected to the corresponding RF reception circuits 15A-15D, and a combining unit 17 connected to the multipliers 16A-16D.

In a transmission process at the base station BS, the distributor 14 duplicates a signal and thereby generates four transmission signals, the multipliers 13A-13D multiply the transmission signals by transmitting antenna weights, and the RF transmission circuits 12A-12D perform predetermined processing on the multiplied transmission signals and send the processed signals from the antennas 11A-11D. The antenna weights are obtained based on an estimated direction of arrival of a signal from the mobile station UE. The antenna weights are used to control amplitudes and phases of the transmission signals and make it possible to emit a highly directional beam EW in the direction of the mobile station UE.

In a reception process at the base station BS, signals (or multiple instances of a signal) from the mobile station UE are received at the antennas 11A-11D, the RF reception circuits 15A-15D perform predetermined processing on the received signals, the multipliers 16A-16D multiply the processed signals by receiving antenna weights, and the combining unit 17 combines the multiplied signals to obtain the original signal.

Using a directional beam in a communication system as described above makes it possible to increase the received power at the mobile station and thereby to improve the transmission quality. For details of AAA-BF, see, for example, 3GPP R1-070859, "Adaptive Beamforming in E-UTRA," NTT DoCoMo, Fujitsu, Mitsubishi Electric, NEC, Sharp; and 3GPP R1-071608, "Beamforming with eight transmit antennas for E-UTRA DL", Ericsson.

DISCLOSURE OF INVENTION

Problems to be Solved by the Invention

In communications employing a directional beam based on antenna weights, the mobile station has to use the antenna weights determined by the base station to demodulate a received signal. In AAA-BF, however, the base station independently determines the antenna weights based on an estimated direction of arrival of a signal without using feedback information from the mobile station. Therefore, the mobile station cannot identify the determined antenna weights without a report from the base station. Accordingly, there is a need for a method for reporting information on antenna weights to the mobile station.

One possible method is to report information on antenna weights using dedicated reference signals (may also be called dedicated pilot channels). In this method, dedicated reference signals are multiplied by the same antenna weights as those used at the base station to control the amplitudes and phases of transmission signals and the multiplied dedicated reference signals are sent to the mobile station. The mobile station demodulates the dedicated reference signals received from the base station according to a predetermined demodulation method and thereby determines the antenna weights used by the base station.

However, using dedicated reference signals may increase the overhead and complicate the configurations of the base station and the mobile station. When taking into account the fact that it has been incorporated in the 3rd Generation Partnership Project (3GPP) standards that a common reference signal (or a common pilot channel) is transmitted from up to four antennas as a nondirectional sector beam covering the entire sector, it is preferable to refrain from further increasing the overhead. For these reasons, it is necessary to provide a method for reporting antenna weights to the mobile station without using dedicated reference signals.

Also, in a case where more than four antennas are used, it is more important to prevent the increase in the overhead and to efficiently use radio resources.

One object of the present invention is to provide a base station, a transmission method, a mobile station, and a reception method that make it possible to report antenna weights used in adaptive antenna array beam forming based on a direction-of-arrival estimation to the mobile station without using dedicated reference signals.

Means for Solving the Problems

An aspect of the present invention provides a base station communicating using multiple antennas. The base station includes a direction-of-arrival estimation unit configured to estimate a direction of arrival based on a signal from a mobile station and to output direction-of-arrival information regarding the estimated direction of arrival; a direction-of-arrival information multiplexing unit configured to multiplex the direction-of-arrival information from the direction-of-arrival estimation unit with a shared data channel to be transmitted to the mobile station; and an antenna weight multiplying unit configured to multiply a signal to be transmitted to the mobile station and including the shared data channel multiplexed with the direction-of-arrival information by antenna weights obtained based on the direction-of-arrival information from the direction-of-arrival estimation unit.

Another aspect of the present invention provides a transmission method for a base station communicating using multiple antennas. The transmission method includes the steps of estimating a direction of arrival based on a signal from a mobile station; generating direction-of-arrival information regarding the estimated direction of arrival; multiplexing the direction-of-arrival information with a shared data channel to be transmitted to the mobile station; and multiplying a signal to be transmitted to the mobile station and including the shared data channel multiplexed with the direction-of-arrival information by antenna weights obtained based on the direction-of-arrival information.

Advantageous Effect of the Invention

An aspect of the present invention makes it possible to report antenna weights used in adaptive antenna array beam forming based on a direction-of-arrival estimation to a mobile station without using dedicated reference signals.

EXPLANATION OF REFERENCES

Figure 1:
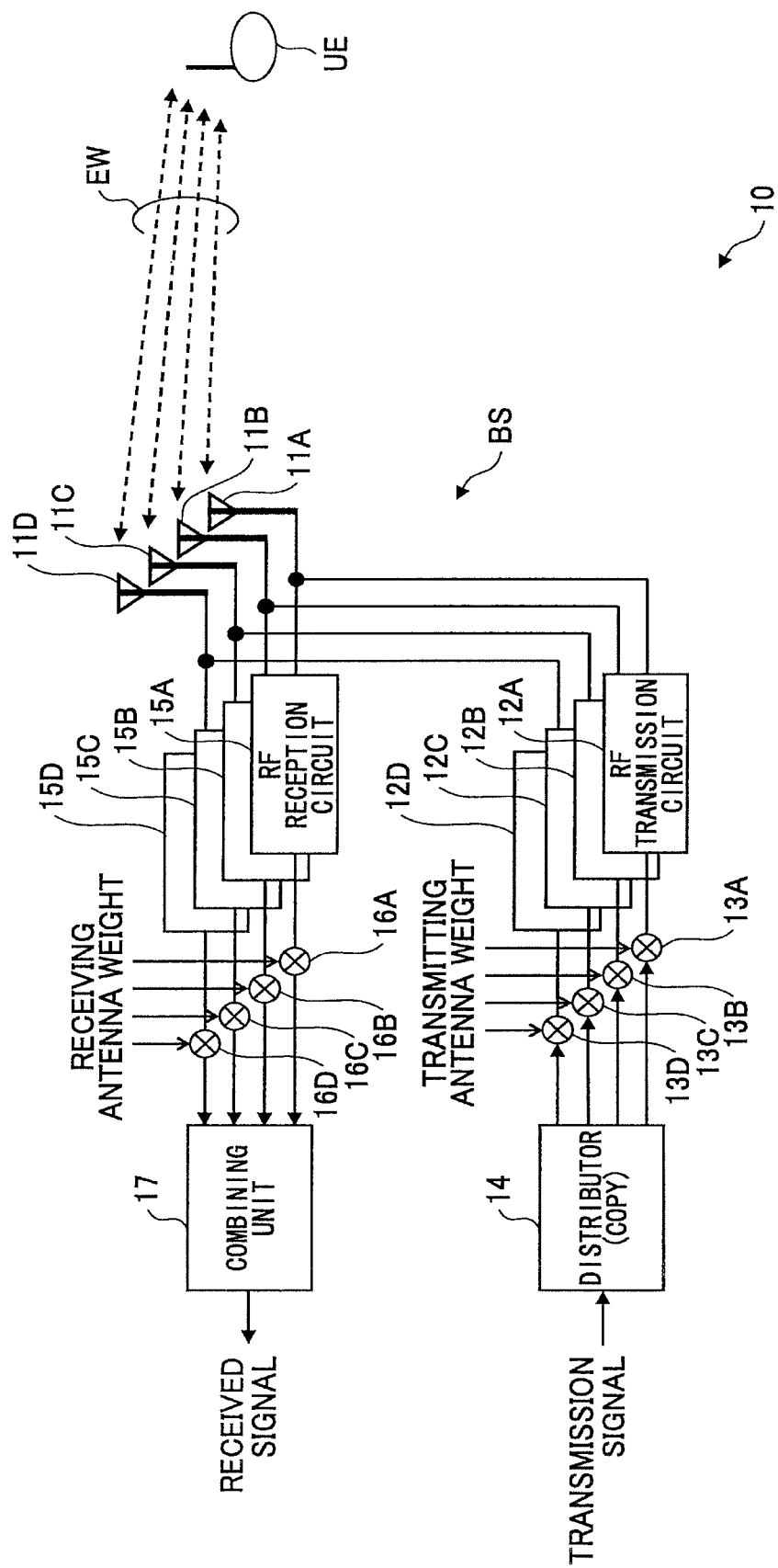
FIG. 1 is a drawing illustrating a communication system employing adaptive antenna array beam forming.

20 Base station
$212_1$-$212_N$ Buffer
$214_1$-$214_N$ DOA information multiplexing unit
216 Scheduler
218 Channel coding unit
220 Data modulation unit
222 Transmitting antenna weight multiplying unit
224A-224H Common reference signal multiplexing unit
226A-226H Inverse fast Fourier transform (IFFT) unit
228A-228H CP adding unit
230A-230H RF transmission circuit
204A-204H Duplexer
206 Direction-of-arrival (DOA) estimation unit
208 Antenna combining unit
210 Demodulation-and-decoding unit
30 Mobile station
302A, 302B Duplexer
304A, 304B RF reception circuit
306A, 306B FFT unit
308 Reception timing estimation unit
310 Antenna information storing unit
312 Antenna weight calculation unit
314 Channel estimation unit
316 Signal detection unit
318 Channel decoding unit
320 CQI estimation unit

BEST MODE FOR CARRYING OUT THE INVENTION

Embodiments of the present invention are described below with reference to the accompanying drawings. Throughout the accompanying drawings, the same or common reference numbers are used for components having the same functions, and overlapping descriptions of those components are omitted.

<First Embodiment>

Figure 2:
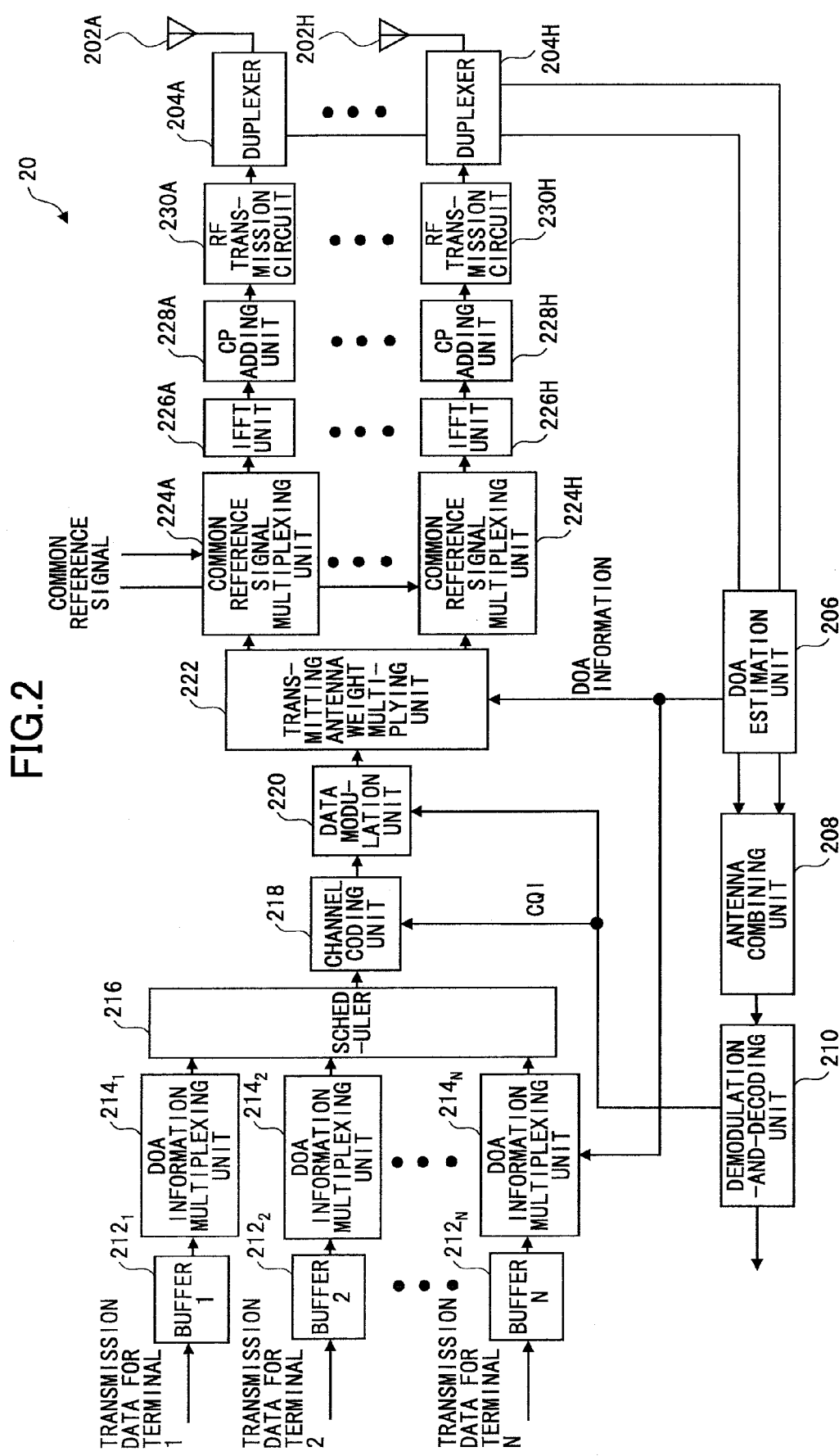
FIG. 2 is a block diagram of a base station according to an embodiment of the present invention.

FIG. 2 is a block diagram of a base station according to a first embodiment of the present invention. As shown in FIG. 2, a base station 20 is an eight antenna system including eight antennas 202A-202H. The base station 20 also includes N buffers $212_1$-$212_N$, N direction-of-arrival (DOA) information multiplexing units $214_1$-$214_N$, a scheduler 216, a channel coding unit 218, a data modulation unit 220, a transmitting antenna weight multiplying unit 222, common reference signal multiplexing units 224A-224H, inverse fast Fourier transform (IFFT) units 226A-226H, CP adding units 228A-228H, RF transmission circuits 230A-230H, duplexers 204A-204H, direction-of-arrival (DOA) estimation unit 206, an antenna combining unit 208, and a demodulation-and-decoding unit 210.

The buffers $212_1$-$212_N$ temporarily store transmission data to be transmitted to the corresponding N mobile stations (not shown) in a cell of the base station 20. Mobile stations may be called user equipment or terminals.

The DOA information multiplexing units $214_1$-$214_N$ are connected to the corresponding buffers $212_1$-$212_N$ and receive the transmission data from the buffers $212_1$-$212_N$. The DOA information multiplexing units $214_1$-$214_N$ also receive DOA information from the DOA estimation unit 206 and multiplex the DOA information with shared data channels of the transmission data received from the buffers $212_1$-$212_N$ to generate transmission signals to be transmitted to the mobile stations.

The scheduler 216 receives the transmission signals to be transmitted to the N mobile stations from the DOA information multiplexing units $214_1$-$214_N$ and allocates radio resources to the transmission signals. The channel coding unit 218 performs predetermined channel coding on the transmission signals from the scheduler 218. The data modulation unit 220 modulates the channel-coded transmission signals according to a predetermined modulation scheme(s).

The transmitting antenna weight multiplying unit 222 receives the modulated signals from the data modulation unit 220 and duplicates each of the modulated signals to generate eight transmission signals corresponding to the number of antennas. In other words, the transmitting antenna weight multiplying unit 222 duplicates each signal to generate eight transmission signals to be transmitted from the corresponding antennas 202A-202H. Thus, the transmitting antenna weight multiplying unit 222 includes a function of a distributor. Also, the transmitting antenna weight multiplying unit 222 receives DOA information from the DOA estimation unit 206, and multiplies the generated (duplicated) transmission signals by antenna weights obtained based on the DOA information to adjust the amplitude and phase of the shared data channel. This causes the shared data channel to be transmitted from the antennas 202A-202H as a directional beam having high directivity in the direction of a destination mobile station.

The eight transmission signals multiplied by the antenna weights are output from the transmitting antenna weight multiplying unit 222 to the corresponding common reference signal multiplexing units 224A-224H. The common reference signal multiplexing units 224A-224H multiplex the transmission signals with a common reference signal and output the multiplexed transmission signals to the corresponding IFFT units 226A-226H. Since the common reference signal is not multiplied by antenna weights, the common reference signal is transmitted as a nondirectional sector beam that covers the entire sector.

The IFFT units 226A-226H perform inverse fast Fourier transformation on the transmission signals received from the common reference signal multiplexing units 224A-224H and output the transformed transmission signals to the corresponding CP adding units 228A-228H. The CP adding units 228A-228H attach cyclic prefixes (CP) to the transmission signals and output the CP-attached transmission signals to the corresponding RF transmission circuits 230A-230H. The RF transmission circuits 230A-230H perform transmission processing (e.g., digital-to-analog conversion, band limitation, and power amplification) on the transmission signals. The processed transmission signals are transmitted via the duplexers 204A-204H and the antennas 202A-202H.

The components from the buffers $212_1$-$212_N$ to the RF transmission circuits 230A-230H described above constitute a transmitting unit of the base station 20. Next, components constituting a receiving unit of the base station 20 are described.

A signal transmitted from a mobile station is received at the antennas 202A-202H and instances of the received signal (hereafter, simply called the received signals) are input via the duplexers 204A-204H to the DOA estimation unit 206. The DOA estimation unit 206 estimates a direction of arrival (DOA) of the received signals using a beamformer method, a Capon method, and/or a multiple signal classification (MUSIC) method. Then, the DOA estimation unit 206 generates DOA information indicating the estimated direction of arrival. The DOA information is output to the DOA information multiplexing units $214_1$-$214_N$, the transmitting antenna weight multiplexing unit 222, and the antenna combining unit 208.

The DOA estimation unit 206 estimates a DOA for each mobile station. That is, the DOA estimation unit 206 receives, via the antennas 202A-202H, a signal from each of the mobile stations in the cell formed by the base station 20, and estimates a DOA for each of the mobile stations. Instead of the DOA estimation unit 206 shown in FIG. 2, multiple DOA estimation units corresponding to the number of mobile stations in the cell may be provided.

The antenna combining unit 208 receives the signals and the DOA information from the DOA estimation unit 206. Then, the antenna combining unit 208 multiplies the received signals by antenna weights obtained based on the DOA information, combines the multiplied signals, and outputs the combined received signal to the demodulation-and-decoding unit 210.

The demodulation-and-decoding unit 210 demodulates and decodes the combined received signal from the antenna combining unit 208 according to predetermined demodulation and decoding schemes and thereby obtains the original signal.

As described above, the DOA estimation unit 206 of the base station 20 estimates a DOA and generates DOA information based on a signal(s) received from each mobile station via the antennas 202A-202H. The DOA information is used by the transmitting antenna weight multiplying unit 222 to obtain antenna weights used to multiply transmission signals. Also, the DOA information is output to one of the DOA information multiplexing units $214_1$-$214_N$ and is multiplexed with a shared data channel to be transmitted to the corresponding mobile station. The shared data channel multiplexed with the DOA information goes through predetermined signal processing and is transmitted as a directional beam to the mobile station. With this configuration, the mobile station can determine antenna weights used by the base station based on DOA information multiplexed with a shared data channel transmitted from the base station.

Meanwhile, to obtain antenna weights used by the base station based on the DOA information, the mobile station also needs antenna information including the number of antennas, the configuration of antennas, and the distance between antennas. The antenna information may be predetermined between the base station 20 and mobile stations to be used with the base station 20. Alternatively, the antenna information may be reported from the base station 20 to the mobile stations as broadcast information (i.e., via a broadcast channel) before the shared data channels multiplexed with the DOA information are transmitted from the base station 20 to the mobile stations. Also, since the number of antennas, the configuration of antennas, and the distance between antennas may vary from cell (or sector) to cell (or sector), the antenna information may be reported as broadcast information (i.e., via a broadcast channel) from the base station 20 to the mobile station when handover (or soft handover) takes place. The configuration of antennas, for example, indicates arrangement of antennas. For example, the arrangement of antennas may indicate whether antennas are arranged in a straight line or in a circular shape when seen from above.

As described above, the base station 20 of this embodiment makes it possible to report antenna weights to the mobile station without using a dedicated reference signal. In other words, the base station 20 of the first embodiment makes it possible to report antenna weights to the mobile station without increasing the overhead and without complicating the configurations of the base station 20 and the mobile station.

<Second Embodiment>

Figure 3:
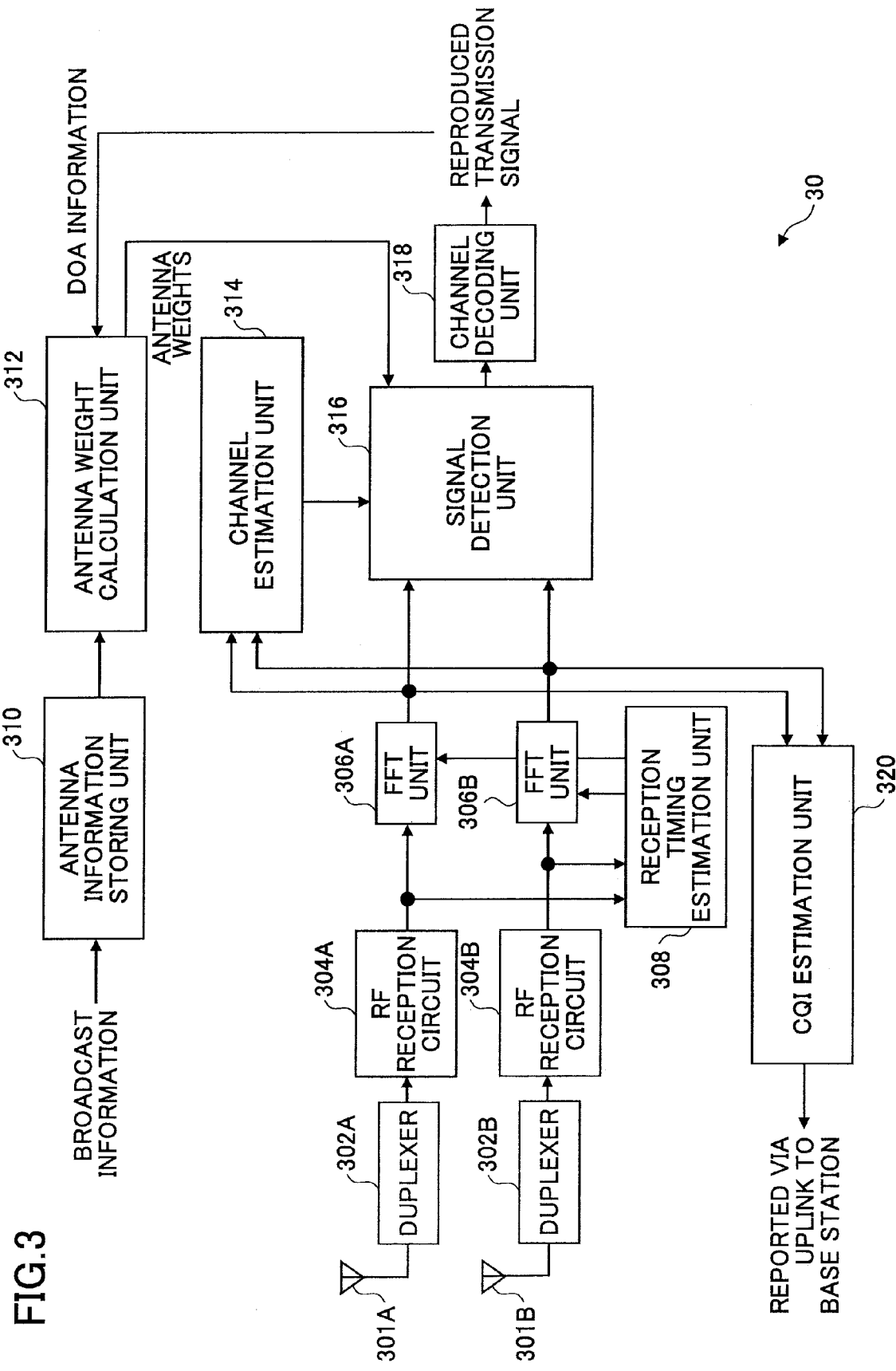
FIG. 3 is a block diagram of a mobile station according to an embodiment of the present invention.

FIG. 3 is a block diagram of a mobile station according to a second embodiment of the present invention. As shown in FIG. 3, a mobile station 30 is a two receiving antenna system including two antennas 301A and 302B, and is designed to be used with the base station 20 (FIG. 2) of the first embodiment.

The mobile station 30 also includes duplexers 302A and 302B, RF reception circuits 304A and 304B, FFT units 306A and 306B, a reception timing estimation unit 308, an antenna information storing unit 310, an antenna weight calculation unit 312, a channel estimation unit 314, a signal detection unit 316, a channel decoding unit 318, and a CQI estimation unit 320.

The RF reception circuits 304A and 304B receive signals from the base station 20 via the receiving antennas 301A and 301B and the duplexers 302A and 302B, and perform predetermined signal processing on the received signals to convert them to baseband digital signals. The signal processing, for example, includes power amplification, band limitation, and analog-to-digital conversion. The RF reception circuits 304A and 304B output the processed received signals to the FFT units 306A and 306B and the reception timing estimation unit 308.

The reception timing estimation unit 308 estimates the reception timings of the processed received signals input from the RF reception circuits 304A and 304B. For example, the reception timing estimation unit 308 uses CPs attached to the signals by the CP adding units 228A-228H (FIG. 2) of the base station 20 to estimate the reception timings. The reception timing estimation unit 308 reports the estimated reception timings to the FFT units 306A and 306B.

The FFT units 306A and 306B perform Fourier transformation on the processed received signals from the RF reception circuits 304A and 304B based on the reception timings reported by the reception timing estimation unit 308. The FFT units 306A and 306B output the transformed received signals to the channel estimation unit 314 and the signal detection unit 316.

Meanwhile, the antenna information storing unit 310 stores antenna information (e.g., the number of antennas, the configuration of antennas, and the distance between antennas) reported in advance by the base station 20 as broadcast information, and outputs the antenna information to the antenna weight calculation unit 312.

The antenna weight calculation unit 312 calculates antenna weights used by the base station 20 based on the antenna information from the antenna information storing unit 310 and DOA information obtained from a shared data channel. The antenna weight calculation unit 312 outputs the calculated antenna weights to the signal detection unit 316.

The channel estimation unit 314 performs channel estimation based on the transformed received signals (or common reference signals in the received signals) from the FFT units 306A and 306B and outputs the channel estimation results to the signal detection unit 316.

The signal detection unit 316 demodulates the transformed signals received from the FFT units 306A and 306B based on the antenna weights from the antenna weight calculation unit 312 and the channel estimation results from the channel estimation unit 314. The signal detection unit 316 outputs a demodulated signal to the channel decoding unit 318.

The channel decoding unit 318 performs channel decoding on the demodulated signal received from the signal detection unit 316 and thereby reproduces the (original) signal transmitted from the base station 20.

The CQI estimation unit 320 measures the reception quality of the signals received via the antennas 301A and 301B based on common reference signals input from the FFT units 306A and 306B. The CQI estimation unit 320 reports the measurement as a channel quality indicator (CQI) to the base station 20.

As described above, the antenna weight calculation unit 312 of the mobile station 30 of this embodiment calculates antenna weights used by the base station 20 based on the DOA information multiplexed with a shared data channel transmitted from the base station 20. This configuration makes it possible to determine antenna weights based on DOA information multiplexed with a shared data channel transmitted from the base station 20. In other words, the mobile station 30 of this embodiment eliminates the need for the base station to report DOA information or antenna weights via dedicated reference signals. Thus, the mobile station 30 of this embodiment can properly communicate with the base station 20, and makes it possible to determine antenna weights without complicating the configurations of the base station 20 and the mobile station 30.

<Third Embodiment>

A method of allocating radio resources to reference signals in cases where five or more antennas are used at the base station is described below with reference to FIG. 4. As described above, the 3GPP standards specify use of four antennas. Still, however, there may be a case where five or more antennas are used. Meanwhile, a method of allocating radio resources to reference signals specified in Long Term Evolution (LTE) is also based on an assumption that four antennas are used for transmission. Thus, it is necessary to provide a different allocation method to use five or more antennas.

Figure 4:
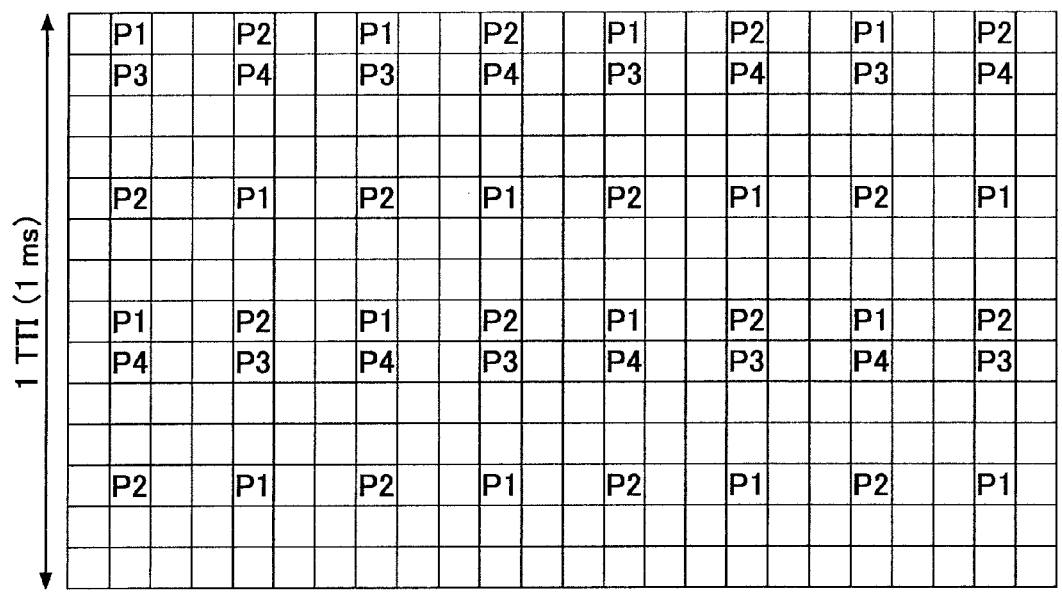
FIG. 4 is a drawing illustrating allocation of radio resources to reference signals in cases where four antennas and six antennas are used for transmission.
Figure 4:
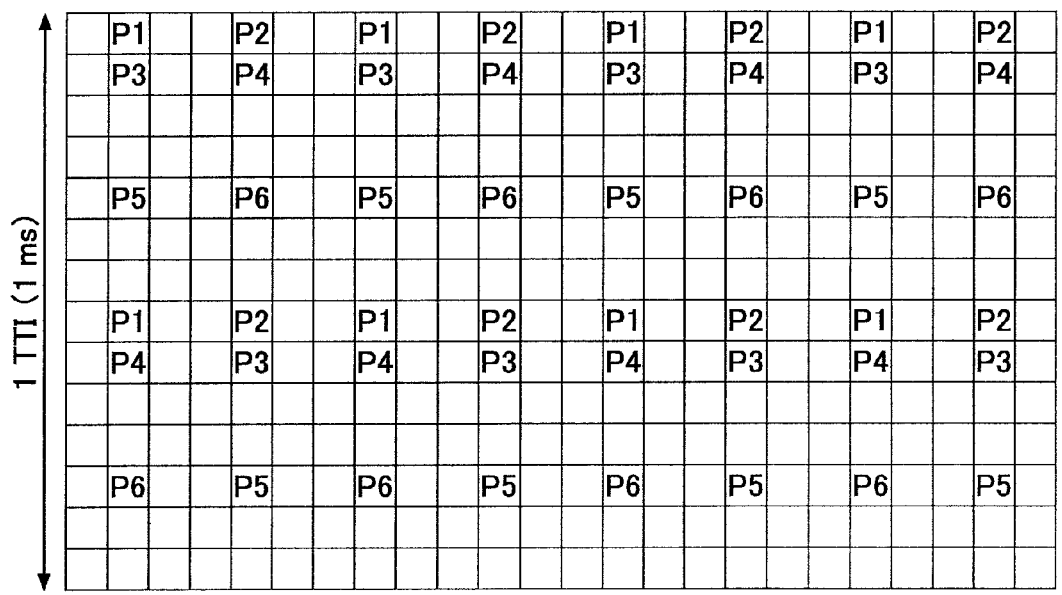

FIG. 4 is a drawing illustrating allocation of radio resources to reference signals in cases where four antennas and six antennas are used for transmission. In FIG. 4, the horizontal direction (frequency direction) indicates resource blocks and the vertical direction (time direction) indicates transmission time intervals (TTI). For brevity, only two resource blocks are shown in FIG. 4. Also in FIG. 4, one TTI corresponds to 1 ms.

FIG. 4 (A) shows a method of allocating radio resources to reference signals specified in LTE where four antennas are used for transmission. In FIG. 4, P1 indicates a symbol where a reference signal is transmitted from antenna #1, P2 indicates a symbol where a reference signal is transmitted from antenna #2, P3 indicates a symbol where a reference signal is transmitted from antenna #3, and P4 indicates a symbol where a reference signal is transmitted from antenna #4. Here, it is assumed that data channels are transmitted in symbols with no reference numbers (P1, P2, (i.e., those symbols are allocated to the data channels).

As shown in FIG. 4 (A), during 0.5 TTI in each resource block, the reference signal is transmitted four times from each of antennas #1 and #2 and transmitted two times from each of antennas #3 and #4 at predetermined timings and using predetermined subcarriers. This is repeated in the next and subsequent 0.5 TTIs.

Meanwhile, as shown in FIG. 4 (B), when six antennas are used for transmission, the reference signal is transmitted from antennas different from those used in the case of four antennas in symbols in the fifth row in the time direction (vertical direction). More specifically, in the same symbols where the reference signal (P2) is transmitted from antenna #2 in the case of four antennas, the reference signal (P5) is transmitted from antenna #5 in the case of six antennas. Similarly, in the same symbols where the reference signal (21) is transmitted from antenna #1 in the case of four antennas, the reference signal (P6) is transmitted from antenna #6 in the case of six antennas. Thus, in FIG. 4 (B), during 0.5 TTI in each resource block, the reference signal is transmitted two times from each of antennas #1-#6. In other words, in the case of six antennas, the number of times the reference signal is transmitted from each of antennas #1 and #2 during 0.5 TTI is reduced from 4 (in the case of four antennas) to 2, and instead, the reference signal is transmitted two times from each of antennas #5 and #6. This method makes it possible to transmit some of the reference signals, which are to be transmitted from four antennas according to the 3GPP standards, from two additional antennas, and thereby makes it possible to use six antennas without changing the allocation pattern.

For example, the base station 20 shown in FIG. 2 may be changed to a six antenna system and used to transmit the reference signal in a manner as shown in FIG. 4 (B). In this case, allocation of radio resources to the common reference signals as shown in FIG. 4 (B) may be performed by the scheduler 216 of the base station 20. Also, the common reference signals transmitted in a manner as shown in FIG. 4 (B) may be received by the mobile station 30 shown in FIG. 3. In this case, the common reference signals mapped to resources as shown in FIG. 4 (B) may be used by the channel estimation unit 314 of the mobile station 30 for channel estimation.

When transmitting common reference signals from six antennas in a system where allocation of radio resources to common reference signals for transmission from four antennas is specified and a mobile station is configured to operate according to the specified allocation of radio resources, it is necessary to report, to the mobile station, resource allocation information for the common reference signals for transmission from six antennas. This resource allocation information may be transmitted as broadcast information (i.e., via a broadcast channel) from the base station to the mobile station before communications are started. For example, if the resource allocation information is predetermined in association with various numbers of transmitting antennas, the mobile station can determine an antenna used to transmit a common reference signal at a given timing in a given subcarrier based only on the number of antennas reported from the base station and can properly perform channel estimation based on the common reference signal.

Thus, even in a system where allocation of radio resources to common reference signals for transmission from four antennas is specified, the third embodiment of the present invention enables the base station to allocate radio resources such that some of the common reference signals specified to be transmitted from four antennas are instead transmitted from two additional antennas, and thereby makes it possible to prevent increase in the overhead.

<Fourth Embodiment>

A fourth embodiment of the present invention is described below. In this embodiment, allocation of radio resources to reference signals for transmission from eight antennas is described based on an assumption that allocation of radio resources to reference signals for transmission from four antennas is specified in the system.

Figure 5:
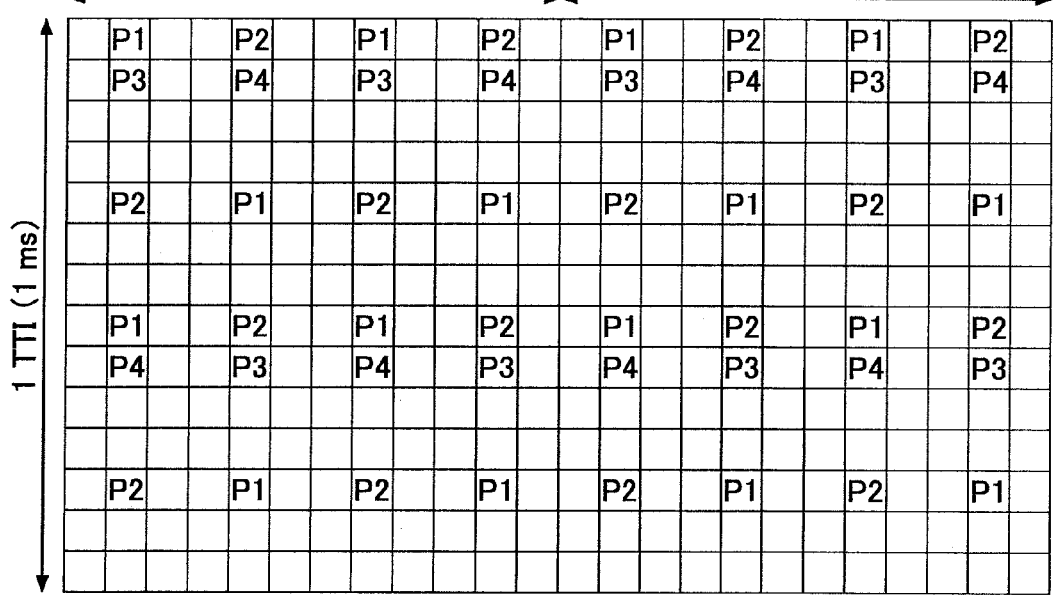
FIG. 5 is a drawing illustrating allocation of radio resources to reference signals in cases where four antennas and eight antennas are used for transmission.
Figure 5:
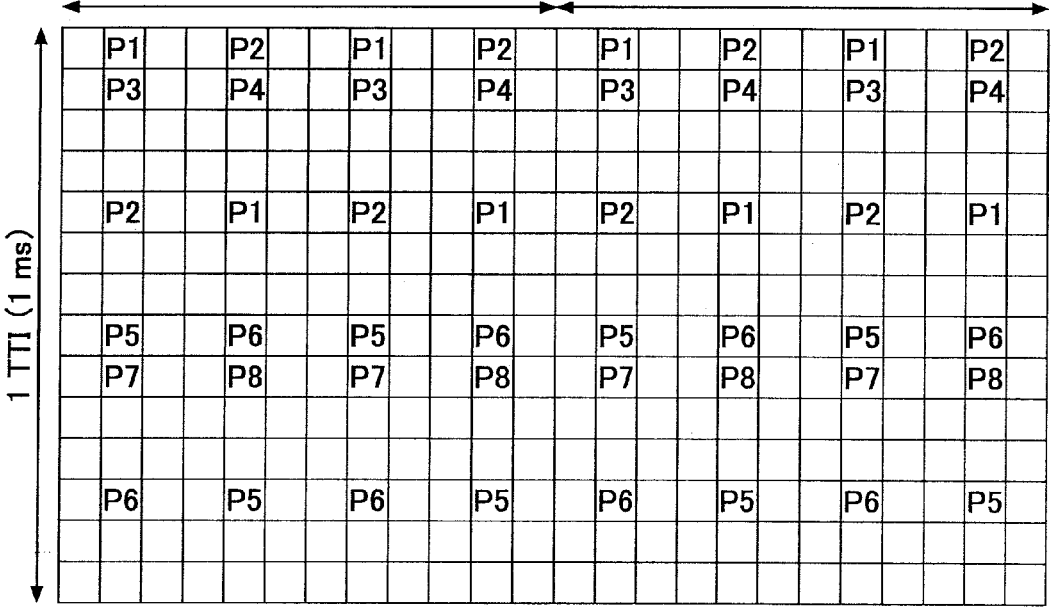

FIG. 5 is a drawing illustrating allocation of radio resources to reference signals in cases where four antennas and eight antennas are used for transmission. In FIG. 5, as in FIG. 4, the horizontal direction (frequency direction) indicates resource blocks and the vertical direction (time direction) indicates transmission time intervals (TTI). For brevity, only two resource blocks are shown in FIG. 5. Also in FIG. 5, one TTI corresponds to 1 ms.

FIG. 5 (A) shows a method of allocating radio resources to reference signals specified in LTE where four antennas are used for transmission. FIG. 5 (A) is substantially the same as FIG. 4 (A) and therefore its descriptions are omitted here.

FIG. 5 (B) shows a method of allocating radio resources to reference signals in a case where eight antennas are used for transmission. In the first 0.5 ms of one TTI, radio resources are allocated to common reference signals to be transmitted from antennas #1-#4 in FIG. 5 (A) and FIG. 5 (B). Meanwhile, in the second 0.5 ms of one TTI in FIG. 5 (B), radio resources are allocated to common reference signals to be transmitted from antennas #5-#8. In other words, in the second 0.5 ms in FIG. 5 (B), common reference signals P1, P2, P3, and P4 are replaced by common reference signals P5, P6, P7, and P8.

According to the LTE specifications, common reference signals are transmitted from antennas #1-#4 in symbols during one TTI in each resource block. Meanwhile, in the case of eight antennas, common reference signals are transmitted from antennas #1-#4 in twelve symbols during one TTI in each resource block and are transmitted from antennas #5-#8 in the remaining 12 symbols.

For example, the base station 20 shown in FIG. 2 may be changed to an eight antenna system and used to transmit common reference signals in a manner as shown in FIG. 5 (B). In this case, allocation of radio resources to the common reference signals as shown in FIG. 5 (B) may be performed by the scheduler 216 of the base station 20. Also, the common reference signals transmitted in a manner as shown in FIG. 5 (B) may be received by the mobile station 30 shown in FIG. 3. In this case, the common reference signals mapped to resources as shown in FIG. 5 (B) may be used by the channel estimation unit 314 of the mobile station 30 for channel estimation.

When transmitting common reference signals from eight antennas in a system where allocation of radio resources to common reference signals for transmission from four antennas is specified and a mobile station is configured to operate according to the specified allocation of radio resources, it is necessary to report, to the mobile station, resource allocation information for the common reference signals for transmission from six antennas. This resource allocation information may be transmitted as broadcast information (i.e., via a broadcast channel) from the base station to the mobile station before communications are started. For example, if the resource allocation information is predetermined in association with various numbers of transmitting antennas, the mobile station can determine an antenna used to transmit a common reference signal at a given timing in a given subcarrier based only on the number of antennas reported from the base station and can properly perform channel estimation based on the common reference signal.

Thus, even in a system where allocation of radio resources to common reference signals for transmission from four antennas is specified, the fourth embodiment of the present invention enables the base station to allocate radio resources in the first half of one TTI to common reference signals to be transmitted from a first set of four antennas and to allocate radio resources in the second half of the TTI to common reference signals to be transmitted from a second set of four antennas, and thereby enables the base station to communicate with the mobile station using eight antennas without increasing the overhead.

Although the present invention is described above based on various embodiments, the present invention is not limited to the above embodiments and variations and modifications may be made without departing from the scope of the present invention.

For example, although the transmitting antenna weight multiplying unit 222 of the base station 20 of the first embodiment includes a function of a distributor, a distributor may be provided as a separate component. Also, instead of one DOA estimation unit 206, multiple DOA estimation units corresponding to the number of mobile stations in a cell may be provided. In this case, an antenna combining unit may be provided for each of the DOA estimation units.

In the first embodiment, the DOA estimation unit 206 includes two functions for estimating a DOA based on a signal(s) from the mobile station and for generating DOA information based on the estimated DOA. Alternatively, the DOA estimation unit 206 may be composed of two components each having one of the two functions. Also, the DOA estimation unit 206 may include still another component such as a storage unit for storing the generated DOA information.

Further, the DOA estimation unit 206 may be configured to determine whether the generated DOA information is different from previous DOA information. In this case, if the generated DOA information is different from the previous DOA information, the DOA estimation unit 206 may be configured to output the previous DOA information (pre-update DOA information) to the transmitting antenna weight multiplying unit 222 and to output the generated DOA information (updated DOA information) to the DOA information multiplexing units $214_1$-$214_N$. With this configuration, the base station can report the updated DOA information to the mobile station before the antenna weights are updated. In other words, the mobile station can receive the updated DOA information based on antenna weights obtained based on the pre-update DOA information that is already known. This in turn enables the mobile station to quickly and accurately obtain updated DOA information (or updated antenna weights). The update interval of DOA information is preferably between about 1 ms and about 500 ms, and more preferably between about 10 ms and about 100 ms.

Although the present invention is described above in different embodiments, the distinctions between the embodiments are not essential for the present invention, and the embodiments may be used individually or in combination.

The above disclosure may be applied to a base station, a transmission method, a mobile station, and a reception method that make it possible to report antenna weights to the mobile station without using dedicated reference signals regardless of the number of antennas. Thus, an aspect of the present invention makes it possible to cope with the increase in the number of antennas.

The above embodiments may also be expressed as follows:

1) The transmission method described above further including the step of reporting to a mobile station antenna information including the number of antennas of a base station, the configuration of antennas, and the distance between antennas as broadcast information before a shared data channel multiplexed with direction-of-arrival information is transmitted.

2) A mobile station communicating with the base station described above and including an antenna weight calculation unit configured to calculate antenna weights used by the base station based on direction-of-arrival information obtained from a shared data channel received from the base station.

3) A reception method for communications performed based on the above transmission method. The reception method includes the step of calculating antenna weights used in the transmission method based on direction-of-arrival information obtained from a shared data channel received.

4) A reception method for communications performed based on the transmission method of 1). The reception method includes the step of calculating antenna weights used in the transmission method based on the antenna information received as the broadcast information and the direction-of-arrival information obtained from the shared data channel received.

5) A base station communicating using (m+n) antennas with a mobile station in a system where allocation of radio resources to common reference signals for transmission from the m antennas is specified. The base station includes a scheduler configured to allocate the radio resources to the common reference signals such that one or more of the common reference signals specified to be transmitted from the m antennas are instead transmitted from the n antennas.

Here, m and n indicate natural numbers. Also, "specified" not only means that the allocation (method) of radio resources is incorporated in the specifications or standards of a standardization group such as 3GPP, but may also mean that the allocation (method) of radio resources is agreed to between multiple communication carriers employing a certain communication method.

6) A transmission method using (m+n) antennas in a system where allocation of radio resources to common reference signals for transmission from the m antennas is specified. The transmission method includes the step of allocating the radio resources to the common reference signals such that one or more of the common reference signals specified to be transmitted from the m antennas are instead transmitted from the n antennas.

7) The transmission method of 6) further including the step of reporting allocation information regarding one or more of the common reference signals to be transmitted from the n antennas to a destination mobile station before starting communications.

8) A mobile station communicating with the base station of 5). The mobile station includes a channel estimation unit configured to perform channel estimation based on the common reference signals transmitted from the (m+n) antennas of the base station.

9) A reception method for communications performed based on the transmission method of 6). The reception method includes the step of performing channel estimation based on the common reference signals transmitted from the (m+n) antennas.

10) A reception method for communications performed based on the transmission method of 7). The reception method includes the step of performing channel estimation based on the reported allocation information and the common reference signals transmitted from the (m+n) antennas.

11) A base station communicating using (m+n) antennas with a mobile station in a system where allocation of radio resources to common reference signals for transmission from the m antennas is specified. The base station includes a scheduler configured to reduce a first number of symbols for the common reference signals specified to be transmitted from the m antennas in a time direction and/or a frequency direction, and thereby to allocate the radio resources such that a second number of symbols for the common reference signals to be transmitted from the m antennas equals a third number of symbols for the common reference signals to be transmitted from the n antennas.

12) A transmission method using (m+n) antennas in a system where allocation of radio resources to common reference signals for transmission from the m antennas is specified. The transmission method includes the steps of reducing a first number of symbols for the common reference signals specified to be transmitted from the m antennas in a time direction and/or a frequency direction; and allocating the radio resources such that a second number of symbols for the common reference signals to be transmitted from the m antennas equals a third number of symbols for the common reference signals to be transmitted from the n antennas.

13) The transmission method of 12) further including the step of reporting allocation information regarding the radio resources allocated to the common reference signals in the allocating step to a destination mobile station before starting communications.

14) A mobile station communicating with the base station of 11). The mobile station includes a channel estimation unit configured to perform channel estimation based on the common reference signals transmitted from the (m+n) antennas of the base station.

15) A reception method for communications performed based on the transmission method of 12). The reception method includes the step of performing channel estimation based on the reported allocation information and the common reference signals transmitted from the (m+n) antennas.

16) A reception method for communications performed based on the transmission method of 11). The reception method includes the step of performing channel estimation based on the reported allocation information and the common reference signals transmitted from the (m+n) antennas.

The present international application claims priority from Japanese Patent Application No. 2007-258108 filed on Oct. 1, 2007, the entire contents of which are hereby incorporated herein by reference.

The invention claimed is:

1. A base station communicating using multiple antennas, comprising:
    a direction-of-arrival estimation unit configured to estimate a direction of arrival based on a signal from a mobile station and to output direction-of-arrival information regarding the estimated direction of arrival;
    a direction-of-arrival information multiplexing unit configured to multiplex the direction-of-arrival information from the direction-of-arrival estimation unit with a shared data channel to be transmitted to the mobile station to allow the mobile station to calculate antenna weights based on the direction-of-arrival information and broadcast information transmitted from the base station; and an antenna weight multiplying unit configured to multiply a signal to be transmitted to the mobile station and including the shared data channel multiplexed with the direction-of-arrival information by antenna weights obtained based on the direction-of-arrival information from the direction-of-arrival estimation unit.

2. A mobile station communicating with the base station of claim 1, the mobile station comprising:
an antenna weight calculation unit configured to calculate the antenna weights used by the base station based on the broadcast information and the direction-of-arrival information multiplexed with the shared data channel received from the base station.

3. A transmission method for a base station communicating using multiple antennas, the transmission method comprising the steps of:
estimating a direction of arrival based on a signal from a mobile station;
generating direction-of-arrival information regarding the estimated direction of arrival;
multiplexing the direction-of-arrival information with a shared data channel to be transmitted to the mobile station to allow the mobile station to calculate antenna weights based on the direction-of-arrival information and broadcast information transmitted from the base station; and
multiplying a signal to be transmitted to the mobile station and including the shared data channel multiplexed with the direction-of-arrival information by antenna weights obtained based on the direction-of-arrival information.

4. The transmission method as claimed in claim 3, further comprising the step of:
transmitting, to the mobile station, the broadcast information before the shared data channel multiplexed with the direction-of-arrival information is transmitted, wherein the broadcast information includes antenna information including a number of the antennas of the base station, a configuration of the antennas, and a distance between the antennas.

5. A reception method for communications performed by a mobile station based on the transmission method of claim 4, the reception method comprising the step of:
calculating the antenna weights used in the transmission method based on the antenna information in the broadcast information and the direction-of-arrival information multiplexed with the shared data channel received from the base station.

6. A reception method for communications performed by a mobile station based on the transmission method of claim 3, the reception method comprising the step of:
calculating the antenna weights used in the transmission method based on the broadcast information and the direction-of-arrival information multiplexed with the shared data channel received from the base station.

* * * * *